United States Patent Office 3,632,659
Patented Jan. 4, 1972

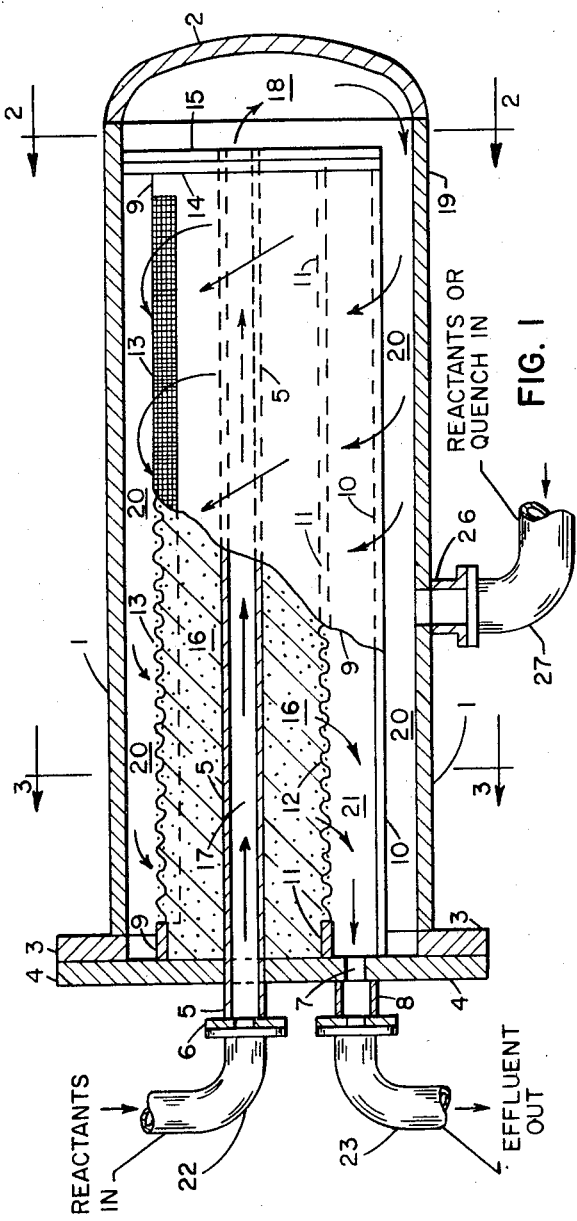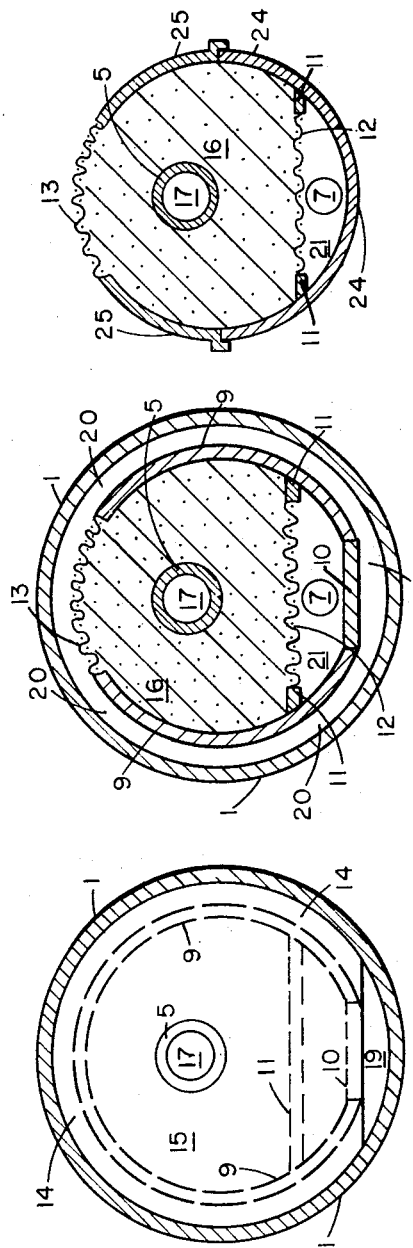

3,632,659
FLUID-SOLIDS CONTACTING
Edwin K. Jones, Kenilworth, Ill., assignor to Universal Oil Products Company, Des Plaines, Ill.
Filed June 18, 1969, Ser. No. 834,286
Int. Cl. C07c 3/00, 3/50
U.S. Cl. 260—671                                    22 Claims

ABSTRACT OF THE DISCLOSURE

Method and apparatus for contacting a feed fluid in a fluid-solids contacting zone. The apparatus comprises an internal chamber containing a fixed bed of particulated contact solids, confined within an external chamber in a manner sufficient to provide an annular space between the walls of the two chambers. Feed fluid is passed into a conduit means axially disposed within the fixed bed and the internal chamber. The feed fluid then passes from the conduit means into the annular space, wherein it flows circumferentially around the internal chamber before entering the fixed bed. The feed fluid passes through the fixed bed transversely to the axis thereof and an effluent fluid is recovered. The method and apparatus have broad application to exothermic and endothermic catalytic reactions since the apparatus affords a means of heat transfer between the feed fluid and the fixed bed before the fluid enters the bed. Specific application is in aromatic alkylation and olefinic oligomerization reactions over a solid phosphoric acid catalyst.

FIELD OF THE INVENTION

The present invention relates to a method and an apparatus for contacting a feed fluid in a fluid-solids contacting zone. It further relates to a method and apparatus for contacting a feed fluid in an exothermic or an endothermic catalytic reaction zone. The present invention particularly relates to a fluid-solids contacting chamber for use in fluid-solids contacting processes wherein a fixed bed of particulated contact solids must be replaced or renewed with great frequency due to physical or chemical deterioration of the contact solids. The present invention most particularly relates to an improved processing method and reaction chamber for effecting aromatic alkylation and olefinic oligomerization reactions over a fixed bed of solid phosphoric acid catalyst.

The present invention finds one preferred application in the production of alkylated aromatic hydrocarbons for use in subsequent chemical synthesis. The present invention particularly finds application in the production of isopropylbenzene or cumene wihch is utilized in the synthesis of phenol, acetone, alphamethylstyrene, and acetophenone. These cumene-derived chemicals are intermediates in the synthesis of resins for plastics and nylon. A further application of the inventive reaction method and the apparatus therefor, is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints.

Application of the inventive apparatus and reaction method may also be found in the alkylation of substituted aromatics such as phenol, which when alkylated with isobutylenes forms O-tertiarybutylphenol which is an intermediate in the synthesis of other chemicals, and forms p-tertiarybutylphenol which is used to modify phenolformaldehyde resins. A further application of the invention for synthesis of substituted aromatic hydrocarbons may be found in the alkylation of para-hydroxyanisole with tertiary butyl alcohol or isobutylene to form butylated hydroxyanisole which finds utility as an antioxidant in the preservation of foods.

The present invention finds additional preferred application in the oligomerization of olefin-acting compounds. Oligomerization of propylene may be undertaken to produce commercial fractions of propylene-trimer and propylene-tetramer, within the scope of the inventive reaction method and apparatus. Trimer finds utility in the synthesis of nonyl-phenol detergents and in the synthesis of decyl alcohols by the Oxo Process. Tetramer is also used in the synthesis of detergents. The invention also finds application in the synthesis of commercial fractions of heptene which are produced by the co-oligomerization of propylene and butenes in a reaction mixture comprising propylene, propane, butene, and butane. Heptene is utilized in the synthesis of octyl alcohols by the Oxo Process. (It is to be noted that oligomerization of olefin hydrocarbons is more commonly referred to as "polymerization of olefins" in the petroleum refining industry.)

DESCRIPTION OF THE PRIOR ART

In one preferred embodiment, the present invention relates to the synthesis of isopropylbenzene or cumene by aromatic alkylation. In the commercial manufacture of cumene, it is the art to charge benzene and propylene into a reaction zone comprising one or more fixed beds of a solid phosphoric acid catalyst. Typically, the benzene is present in a molar excess in order to enhance the monoalkylation of the aromatic and in order to provide an excess of reactant which may absorb the exothermic heat of reaction. In addition, it is typical in the art to provide unreactive propane diluent in the reaction zone to act as a quench material for maintaining the exothermic reaction at temperature levels which enhance product yields while preserving catalyst activity.

In a further preferred embodiment, the present invention relates to the synthesis of propylene tetramer by the oligomerization of propylene. In the commercial manufacture of tetramer, it is the art to charge a propylene-propane mixture into a reaction zone comprising one or more fixed beds of solid phosphoric acid catalyst. The unreactive propane is present in the reaction zone as a means of controlling the degree of oligomerization of the propylene by acting as a diluent, and it also provides a material for quenching the exothermic reaction.

The use of fixed beds of solid phosphoric acid catalyst for such typical aromatic alkylation and olefinic oligomerization reactions has been known for some time, and it has been well established that this type of catalyst is susceptible to deterioration of both a chemical and physical nature due to an alteration of its moisture content. The loss of moisture causes deterioration of the catalyst by powdering and caking, ultimately resulting in the build-up of a high pressure drop through the catalyst bed and subsequent heat exchange equipment. On the other hand, when excessive moisture is present in the feed to the reaction zone, the catalyst softens and tends to form sludge. The sludge also causes plugging of the catalyst bed and fouling of heat exchange equipment with a resulting increase in pressure drop.

The problem of proper hydration control on the catalyst is particularly prevalent in aromatic alkylation processing. The aromatic hydrocarbons have a pronounced tendency to leach chemically combined water out of the catalyst particles, thereby changing the balance between chemically fixed phosphoric acid and free $P_2O_5$. This loss of moisture not only results in the physical and chemical deterioration of the catalyst as noted hereinabove, but it also produces a loss of catalyst activity. Operation with low activity catalyst requires an increase in operating temperature levels, resulting in an increase in by-product production, and in an accelerated physical deterioration of the catalyst due to the deposition of carbonaceous deposits which result in plugging the catalyst beds.

It is, therefore, typical in the art of aromatic alkylation to inject a controlled amount of water into the combined reactor feed in order to maintain catalyst hydration at an optimum operating level. Typically, the water injection rate is maintained at a level of from about 100 p.p.m. to 500 p.p.m. in aromatic alkylation processing. For example, in the alkylation of benzene with propylene to produce cumene, it is preferred that the water injection rate be sufficient to maintain a moisture content in the combined reactor feed of from 200 p.p.m. to 250 p.p.m.

While the problem of maintaining proper catalyst hydration is most pronounced in aromatic alkylation processing, it is well known by those skilled in the art that the problem also exists in olefinic oligomerization processing. The typical feed to a tetramer plant, for example, will comprise a propylenepropane mixture which has been substantially dehydrated in prior processing operations. Thus, the comments made hereinabove concerning water injection into the reactor feed and the typical dehydration of the solid phosphoric acid catalyst, therefore, apply with equal force to the olefinic oligomerization process. The noted difference is that the moisture content of the reactor feed must be maintained at a higher level in the oligomerization process. This necessity for a higher moisture level is due to the difference in reactor operating conditions between the aromatic alkylation and olefinic oligomerization processes.

It is well known to those skilled in the art that in spite of prior art water injection techniques, proper catalyst hydration control is rarely achieved in the commercial operation of aromatic alkylation processing units and olefinic oligomerization processing units. The water injection equipment usually comprises a small pump and a small water tank. Since the water injection rate is only a few parts per million based upon the combined reactor feed, the typical flow rate which is required will be about 1 gallon per hour of water for a processing unit typically charging 3,000 barrels per day of hydrocarbon feed.

Because the water injection processing equipment is so small in comparison to the aromatic alkylation unit or the olefinic oligomerization unit, this equipment tends to be neglected by the operating personnel. As a consequence, the water injection tank may run dry so that the combined feed being charged to the reactor will be substantially void of moisture. Upon other occasions the pump rate may be set too high thereby providing that the combined feed will contain an excessive amount of moisture. Therefore, it is typical commercial operating experience that the water injection rate fluctuates too widely for proper hydration control on the solid phosphoric acid catalyst contained within the reactor. This wide fluctuation of water injection rates often results in a premature physical deterioration of the catalyst in the manner set forth hereinabove. As previously noted, the catalyst prematurely loses activity, thus requiring an increase in operating temperatures, thereby resulting in an increase of by-product formation and deposition of carbonaceous material on the catalyst. The ultimate result is that the typical commercial unit having irregular control of the water injection rate to the reactor, will require a premature plant shut-down due to the catalyst deterioration, and the net result is that the operation produces unnecessary economic losses.

In addition to the proper hydration control of solid phosphoric acid catalyst, the problem is further complicated by the presence of trace contaminants in the typical feedstocks to the reaction zone. For example, trace amounts of organic nitrogen compounds will poison the solid phosphoric acid catalyst and force operation at higher temperature levels which in turn accelerate dehydration of the catalyst and deposition of carbonaceous materials in the catalyst bed. Additionally, trace quantities of diolefins and oxygen in the feed will produce heavy polymers which are deposited on the catalyst bed. These trace contaminants, therefore, not only shorten catalyst life but they produce a premature plugging of the catalyst bed.

Eventually the solid phosphoric acid catalyst bed acquires an excessive pressure drop. This pressure drop is typically due to plugging caused by the powdering or caking of the catalyst and to the deposition of heavy hydrocarbon polymers and other carbonaceous materials. When excessive pressure drop is experienced, it is necessary to shut down the operating plant and change the catalyst in the reaction zone.

The typical commercial reaction zone consists of a vertical reactor containing a plurality of separate superimposed catalyst beds. Usually by means of pressure gauges it is known prior to shut down, which of the catalyst beds are plugged. Usually, although not always, only the top catalyst bed shows the excessive pressure drop. But since all beds are in a single reactor, the entire reactor must be shut down and all catalyst beds must be removed out the bottom of the reactor in order to remove those beds which show definite signs of plugging. Thus, upon changing the catalyst in the reactor, it is typical to discover that only a minor portion of the catalyst was contaminated and plugged by the carbonaceous deposits and that much of the catalyst in the reactor was still in an operable condition. Therefore, the excessive pressure drop is premature in that it requires the dumping and wasting of a major portion of the catalyst. High frequency of plugging of the catalyst in the reactor and the subsequent waste of active catalyst in this manner produces an unnecessary expense in commercial units.

SUMMARY OF THE INVENTION

It is, therefore, a broad object of the present invention to provide an improved fluid-solids contacting chamber in which various fluid-solids contacting processes may be undertaken within a contacting zone comprising a bed of particulated contact solids in a manner sufficient to provide a minimum pressure drop during operation.

It is another broad object of this invention to provide an improved fluid-solids contacting chamber wherein a bed of particulated contacting solids may be removed and replaced in a most efficient and facile manner.

It is, however, a primary object of the present invention to provide an improved method for effecting aromatic alkylation and olefinic oligomerization reactions and to provide a novel reaction chamber therefor.

It is a particular object of this invention to provide an improved reaction chamber wherein aromatic alkylation and olefinic oligomerization reactions may be undertaken in the presence of a solid phosphoric acid catalyst.

These and other objects of the present invention, as well as the advantages to be accured therefrom, will be more fully understood as the invention is set forth by the following disclosure in light of the accompanying figures.

FIG. 1 is a longitudinal sectional elevational view of the inventive fluid-solids contacting chamber and illustrates one particular embodiment thereof.

FIGS. 2 and 3 comprises cross-sectional views of the contacting chamber disclosed in FIG. 1. FIG. 2 is a cross-sectional view taken along line 2—2 of FIG. 1, while FIG. 3 is a cross-sectional view taken along line 3—3 of FIG. 1.

FIG. 4 is a cross-sectional view of one modified embodiment of the apparatus as disclosed by FIG. 1 and FIG. 3. FIG. 4 essentially comprises a cross-sectional view of the reaction chamber of FIG. 1 taken along line 3—3, but some elements which comprise the apparatus have been modified to illustrate one preferred embodiment of FIG. 4.

Broadly speaking, the inventive fluid-solids contacting chamber comprises a horizontally elongated external chamber within which there is disposed a horizontally elongated internal chamber which contains the bed of particulated contact solids, which in the preferred embodiment comprises a solid phosphoric acid catalyst. In the preferred embodiment, passing substantially axially through the horizontally elongated internal chamber there is provided a feed fluid conduit means which is not only confined in the chamber but which is also encompassed by the catalyst bed. The internal chamber containing the catalyst bed is positioned horizontally within the external chamber in a manner sufficient to provide an annular space between the horizontally elongated walls of the two chambers. The fluid conduit means passing through the internal chamber communicates with an end space of the external chamber which is substantially isolated from the annular space confined between the chambers. The end space preferably communicates with the annular space only by a single fluid opening.

The reaction chamber comprising the horizontally elongated external chamber and the horizontally elongated internal chamber is fabricated in a manner by which the internal chamber may be withdrawn from the external chamber for changing of the particulated contact solid, or solid phosphoric acid catalyst in the preferred embodiment, contained within the internal chamber. The internal chamber is fabricated of elements which provide for a rapid opening of the internal chamber for dumping the plugged or spent catalyst bed and for a quick insertion of fresh catalyst.

In utilizing the inventive apparatus, the reactant feed enters the reaction chamber by means of the fluid conduit means which is centrally disposed within the internal chamber and encompassed by the catalyst bed. The fluid is discharged from the conduit means into the end space of the external chamber and passes therefrom into the annular space which is confined between the horizontally elongated walls of the external and internal chambers. Preferably, the feed fluid is discharged from the end space into the bottom of the annular space. The feed fluid passes upwardly within the annular space in a circumferential manner around the internal chamber, and in a flow direction which is substantially transverse to the axis of the chamber and to the axis of the chamber and to the axis of the annular space. The feed fluid then passes through a perforated section of the horizontally elongated wall of the internal chamber at an upper locus and into the catalyst bed in a downward direction. The feed fluid, thus, passes downwardly through the catalyst bed in a substantially countercurrent flow direction when compared to the direction of flow which is experienced in the annular space. In addition, the feed fluid passing through the catalyst bed in a downward direction passes transversely to the horizontal direction of flow of the feed fluid passing through the conduit means contained horizontally and substantially axially in the bed. The feed fluid finally is withdrawn from the catalyst bed at the bottom of the internal chamber and is passed out of the reaction chamber for further processing.

In summary, therefore, a broad embodiment of the present invention may be characterized as a fluid-solids contacting chamber which comprises in combination, an elongated substantially confined external chamber; an elongated substantially confined internal chamber disposed within the external chamber in a manner sufficient to confine an annular space between the chamber; a first fluid inlet means in the external chamber having fluid communication with the annular space at a first locus; a second fluid inlet means in the internal chamber having fluid communication with the annular space at a second locus removed from the first locus, and contained in a section of the internal chamber confining the annular space whereby the internal chamber and the annular space are in direct fluid communication; and, means for passing fluid out of the internal and external chambers in fluid isolation from the annular space.

A further broad embodiment of the present invention may be characterized as a fluid-solids contacting chamber which comprises in combination, an elongated external chamber having one closed end and one open end; a substantially imperforate external end member containing a first fluid opening and a second fluid opening, attached to the open end of the elongated external chamber in a manner sufficient to cover the open end and thereby confine the elongated external chamber; a substantially imperforate elongated internal wall member having a perforated section, attached to the external end member, encompassing the first and second fluid openings, projecting into the elongated external chamber in a manner sufficient to provide an annular space therein, and terminating a finite distance from the closed end thereof; an internal end member containing a third fluid opening, attached to the internal wall member adjacent to the closed end of the elongated external chamber whereby an internal chamber is confined within the internal wall member and the internal and external end members, and fitted against the elongated external chamber in a manner sufficient to provide an end space adjacent to the closed end substantially isolated from the annular space and in fluid communication therewith by means of a fourth fluid opening adjacent to an imperforate section of the internal wall member; and, a fluid conduit means within the internal chamber, passing from the first fluid opening to the third fluid opening.

The present invention may be further characterized as the fluid-solids contacting chamber disclosed in the paragraph immediately above wherein the internal chamber contains a bed of particulated contact solids. Furthermore, in a preferred embodiment, the bed of particulated contact solids comprises a fixed bed containing a solid phosphoric acid catalyst.

In addition, the present invention may be broadly characterized as a method of contacting a feed fluid in a fluid-solids contacting zone to produce an effluent fluid which comprises, passing the feed fluid into a conduit means substantially axially disposed within a bed of particulated contact solids in a first direction of flow; passing the feed fluid from the conduit means into an annular fluid passageway encompassing the bed of particulated contact solids; passing the feed fluid within the annular passageway in a second direction of flow substantially circumferential and transverse to the first direction of flow and to the axis of the annular passageway; passing the feed fluid from the annular passageway into the bed of particulated contact solids in a third direction of flow substantially transverse to the first direction of flow and to the axis of the annular passageway, and substantially countercurrent to the second direction of flow; and, recovering effluent fluid from the bed of particulated contact solids.

The present invention may now be more clearly understood by referring to the accompanying figures which set forth preferred embodiments of the invention.

DESCRIPTION OF THE FIGURES

As noted hereinabove, FIG. 1 comprises a longitudinal sectional elevation of one preferred embodiment of the inventive apparatus. FIG. 1 illustrates the horizontally elongated external chamber which contains within it a horizontally elongated internal chamber containing a fixed bed of particulated contact solids.

Referring now to FIG. 1, there is shown the elongated external chamber comprising a horizontally elongated wall 1 having one closed end and one open end. The closed end of the elongated external chamber is comprised of an elliptical head 2 while the open end of the external chamber comprises an open flange 3. The elongated wall 1 of the external chamber may also be provided with a fluid inlet port 26.

Attached to the open end of the elongated external chamber is a substantially imperforate external end member 4 containing two fluid openings. The external end member 4 is shown as a blind flange but any equivalent device may be used such as a detachable elliptical head or other type of head member. The first fluid opening in the substantially imperforate external end member 4 comprises a conduit means 5 extending out of the reaction vessel and having attached thereto an open flange 6 which provides a means of attachment for the inlet piping 22. The second fluid opening in the external end member 4 is a hole 7 which is encompassed by a fluid outlet nozzle 8 projecting externally from the vessel to which there is appended outlet piping 23.

The internal elongated chamber which contains a catalyst bed 16 comprises a horizontally elongated wall which is made up of several sections. The elongated wall comprises a horizontal plate member 10 to which there is attached a cylindrical wall section 9 having a perforated section 13 included therein at the top of the substantially cylindrical wall member 9. The perforated section 13 is illustrated as being a woven screen section, but those skilled in the art will realize that the perforated section 13 may comprise a series of holes or slots which are drilled or cut into the substantially imperforate member 9, or any other perforated means may be employed. These elements comprising the horizontal plate 10, the substantially cylindrical wall member 9, and the perforated section 13 comprise the elongated horizontal wall of the internal chamber which is attached internally to the end member 4 in a manner sufficient to encompass the fluid conduit means 5 and fluid outlet opening 7. Attached to the end of the internal chamber and adjacent to the closed end of the external chamber is an internal end member 15 which is attached to the horizontal plate member 10 and the cylindrical wall member 9 by means of an open flange 14. The internal end member 15 contains a third fluid opening which comprises the internal open end of the fluid conduit means 5.

It may be seen in FIG. 1 that the horizontally elongated wall of the internal chamber comprising elements 10, 9 and 13, is spaced a finite distance apart from the horizontally elongated wall 1 of the external chamber in a manner sufficient to provide an annular space 20. The internal end member 15, adjacent to the closed end of the external chamber and sealing the internal chamber, is fitted against the wall of the external chamber 1 in a manner sufficient to essentially seal off the annular space 20 from the end space 18 which is confined between the internal end member 15 and external end member 2. The internal end member 15 may be more clearly seen by referring to FIG. 2 which comprises a cross-sectional view of FIG. 1 taken along line 2—2.

In FIG. 2 there is shown the substantially cylindrical wall 1 of the external chamber encompassing the internal end member 15 which has a substantially circular configuration but which has circular segment omitted in order to provide a fluid opening 19 at the bottom of the chamber. Fluid opening 19 provides a means of communication from the end space 18 of FIG. 1 into the annular space 20 which is confined between the external and internal chambers. In FIG. 2 there is also shown the substantially circular configuration of the internal chamber which is confined by the elongated wall of the chamber comprising the bottom plate 10 and the substantially cylindrical section 9. Also shown in FIG. 2 is the fluid opening in the internal end member 15 which comprises the internal open end of conduit means 5.

Referring again to FIG. 1, there is shown an internal partitioning member 11 having a perforated central section 12. Partitioning member 11 extends from the external end member 4 to the internal end member 15 and is attached to the cylindrical wall member 9 in a manner sufficient to provide for the separation of the internal chamber into upper and lower zones. The upper zone contains the catalyst bed 16 encompassing the fluid conduit means 5, whereas, the lower zone provides a fluid passageway 21 leading to the fluid outlet opening 7 and the fluid outlet port 8.

The internal construction of the internal chamber may be more readily ascertained by now referring to FIG. 3 which provides a cross-sectional view of FIG. 1 taken along line 3—3. In FIG. 3 there is again shown the external chamber wall 1 encompassing the internal chamber and spaced apart from the internal chamber in a manner sufficient to provide the annular space 20 between the chamber walls. As noted hereinabove, the horizontally elongated wall of the internal chamber comprises the bottom plate 10 and the cylindrical wall member 9 containing a perforated section 13 at the top. Attached to the wall member 9 is the partitioning member 11 having the perforated central section 12. The perforated central section 12 is shown for illustrative purposes as a woven screen section, but member 12 may comprise any means of perforation in the center of partitioning plate 11. Also shown in FIG. 3 is the conduit means 5 which is confined in the upper zone provided by partitioning member 11, and which is encompassed by the catalyst bed 16. Below the partitioning member 11 there is shown the fluid passageway 21 which leads to the fluid outlet opening 7 in the external end member 4.

The method of contacting a feed fluid in the fluid-solids contacting zone contained within the internal chamber of the inventive apparatus may be more clearly understood by again referring to FIG. 1. As noted hereinabove, one preferred application wherein the apparatus of the present invention finds utility is in the aromatic alkylation of benzene with propylene to produce cumene.

Referring now to FIG. 1, a typical hydrocarbon mixture comprising benzene, propylene and propane diluent enters the apparatus of the present invention via inlet conduit means 22 attached to the fluid conduit means 5. The feed fluid passes into a central passageway 17 within the conduit means 5 which is centrally located within the catalyst bed 16. The feed fluid typically will be at a temperature in the neighborhood of about 350° F. Since the aromatic alkylation reaction is exothermic in nature, the feed fluid will absorb exothermic heat of reaction from the catalyst bed 16 as it passes through the bed via fluid passageway 17 confined in the conduit means 5. The resulting preheated feed fluid is discharged from conduit means 5 into the end space 18 which is confined between the end member 15 and the external head 2 of the external chamber.

The feed fluid, which is now at an increased temperature of about 375° F. is directed downwardly from the end space 18 into fluid opening 19, since the end member 15 is fitted tightly against the external shell 1 of the external chamber. The feed fluid passes via fluid opening 19, under bottom member 10, and into the annular space 20. The feed fluid passes upwardly and circumferentially around both sides of the horizontally positioned internal chamber via annular space 20. As noted hereinabove, the aromatic alkylation reaction is exothermic, and the feed fluid picks up an additional amount of heat from the catalyst bed 16 as it passes upwardly and circumferentially around the outer surfaces of the internal chamber. When the feed fluid reaches the top of the annular space 20 and the top of the internal chamber, it passes down into the catalyst bed 16 via the perforated section 13 at a temperature of about 385° F. to about 405° F.

Upon entering the catalyst bed 16, the propylene reacts with the benzene to produce cumene as the preheated feed passes downflow through the catalyst which comprises a solid phosphoric acid composite. The reaction of propylene and benzene to produce cumene releases a substantial amount of heat, one part of which is transferred to the incoming feed fluid through the surface of the conduit means 5, and a second part of which is passed to the incoming feed fluid through the surface of the horizontally elongnated internal wall member 9 of the internal chamber. The effluent fluid comprising benzene, propane and cumene passes from the catalyst bed 16 via the central perforated section 12 in the partitioning member 11, into the bottom fluid passageway 21

In environments where the catalyst may be subjected to powdering to produce catalyst fines or where carbonaceous deposits may be produced, the fluid passageway 21 may contain a filter medium (not shown) which will retain the catalyst fines or other particulate matter within the catalyst bed or within the filter medium, in a manner sufficient to provide that no particulate matter will pass out of the chamber and thereby deposit in subsequent processing equipment. The type of filter medium which is suitable for this purpose may comprise preformed fiberglass, asbestos cloth, glass cloth, or even a packed bed of silica, bauxite, alumina, clay, etc. The final effluent mixture is withdrawn from the fluid passageway 21 via fluid opening 7 and outlet port 8, and passed into discharge conduit means 23. The effluent is subsequently processed to recover cumene product.

The foregoing discussion of the method of contacting a feed fluid in the inventive apparatus, comprises only one preferred embodiment of the present invention. However, FIG. 1 also shows a fluid inlet port 26 and conduit means 27 disposed in the elongated wall 1 of the external chamber. (These elements may alternatively be provided in end member 2, or in external head member 4 in communication with annular space 20.) The fluid inlet port 26 may be employed in processing embodiments wherein a part of the reactant feed mixture or a quench material is introduced directly into the annular space. For example, in some operations the exothermic heat of reaction may be insufficient to adequately preheat the feed fluid, and a part of the feed may be externally preheated and then introduced into the annular space 20 via inlet port 26. Or, the exothermic reaction may liberate too much heat for preheating the feed, in which case a quench fluid may enter the chamber via fluid inlet port 26. In a still further operational embodiment, not the preferred embodiment, all feed fluids may be introduced into the apparatus via inlet port 26 and employment of conduit means 5 may be eliminated.

As noted hereinabove, the fluid-solids contacting chamber of the present invention is fabricated in a manner sufficient to provide that the internal chamber may be removed from the external chamber in order to remove the particulated contact solids which are contained within the contacting zone. Thus, when the pressure drop between the inlet and outlet of the contacting chamber indicates that either the bed of solid phosphoric acid catalyst 16, or any filter medium contained within fluid passageway 21, or both, are plugged with catalyst fines or carbonaceous deposits, the catalyst bed must be removed and replaced with fresh catalyst. At this point the reaction chamber may be taken off-stream by suitable manifolding, and the inlet conduit means 22 and the outlet conduit means 23 are then disconnected from the chamber.

The internal chamber is next disconnected from the external chamber by disconnecting member 4 from member 3. The internal chamber is then withdrawn from the external chamber which comprises the elements 1, 2 and 3. Upon the withdrawal of the internal chamber from the external chamber, the internal end member 15 is disconnected from the internal flange 14 and conduit means 5, in order to open the end of the internal chamber and provide an access to the catalyst bed 16 and the fluid passageway 21. Catalyst particles may then be withdrawn from the internal chamber and the filter medium may be withdrawn from a fluid passageway 21 through the open end of the internal chamber.

It is well known to those skilled in the art that under some circumstances of operation, the deposit of carbonaceous materials on solid phosphoric acid catalyst produces a hard agglomeration of the catalyst particles which is extremely difficult to remove from the reactor. Therefore, in a preferred embodiment of this invention, the perforated section 13 at the top of the chamber may be detached from the wall member 9 in order to provide an added means of access to the catalyst bed. In this manner, the catalyst particles 16 may be more easily rodded out or broken up in order to remove them from the open end which was provided by the detachment of end member 15. In addition, where a filter medium is employed in fluid passageway 21, the filter medium may become extremely blinded and agglomerated by catalyst and carbonaceous particles, and thereby become difficult to remove. Consequently, the wall member 10 at the bottom of the internal chamber may be detached from the chamber wall member 9 in order to provide an added means of access to fluid passageway 21 for removal of any filter medium contained therein.

FIG. 4 illustrates a further modification of the present invention wherein the internal chamber has been modified in order to greater facilitate the removal of a plugged catalyst bed. FIG. 4 is a cross-sectional view of the internal chamber similar to FIG. 3. In FIG. 4 it will be seen that the horizontally elongated wall of the internal chamber comprises a lower section 24 and upper section 25 containing a perforated central section 13. Partitioning member 11 containing a perforated center section 12 is attached to the lower wall member 24, and the conduit means 5 is encompassed by the catalyst bed 16. In order to remove a catalyst bed which has become heavily agglomerated due to deposition of carbonaceous material, the upper wall member 25 containing the central perforated section 13 is detached from the lower wall member 24 in order to expose the entire top of the catalyst bed and thereby further facilitate the physical removal of the agglomerated catalyst bed.

The embodiment which is disclosed in FIG. 4 may be further modified by providing that the elongated wall member comprising the lower section 24 and the upper section 25 is fabricated of a single wall section having a single seam or closure. In such an embodiment the structural strength of the internal chamber would be provided by a structural cage of elongated support rods combined with support rings in a manner sufficient to provide a cylindrical cage containing conduit means 5 and partitioning member 11. The elongated wall member would be fabricated of relatively thin shell of metal sheet which would be supported upon the cylindrical structural cage of the internal chamber. In order to remove the agglomerated catalyst bed, the single seam or closure of the wall member would be disconnected and the entire shell comprising the external surface of the cylindrical internal chamber would be peeled back and off of the structural cage in order to completely expose the outer surface of the catalyst bed 16. The catalyst bed 16 could then be most easily removed from within the structural cage.

In order to reload catalyst or particulated contact solids into the contacting zone contained within the internal chamber, and in order to load additional filter medium to fluid passageway 21 when so desired, all detachable elements of the elongated wall are replaced in a manner sufficient to once again reestablish a substantially cylindrical configuration. Catalyst is then loaded through the open end of the internal chamber. Internal end member 15 is next attached to the elongated wall members by means of the flange member 14. With a fresh load of particulated contact solids in the internal chamber, the entire chamber is then inserted into the external chamber comprising the wall member 1 having a closed end 2 and an open end 3. The external end member 4 again is attached to the flange member 3 in a manner sufficient to enclose the external chamber. The fluid contacting chamber is then ready to be placed in fluid contacting service.

PREFERRED EMBODIMENTS

The manner of operation of the inventive apparatus is readily ascertainable to those skilled in the art from the teachings which have been presented hereinabove. In addition, the various elements comprising the inventive fluid contacting apparatus which have been set forth in the figures, and in the discussion relating thereto, are readily apparent to those skilled in the art.

The advantages to be accrued from the inventive fluid-solids contacting chamber are equally apparent. In particular the inventive apparatus affords a means of more easily removing a deactivated or plugged bed of particulated contact solids and replacing the bed in a more facile manner. For example, in order to minimize the downtime for a reactor in a commercial aromatic alkylation or olefinic oligomerization plant, a spare internal chamber may be maintained with a fresh load of catalyst. Then when the catalyst bed which is on-stream becomes deactivated or plugged with catalyst fines or carbonaceous deposits, the inventive fluid-solids contacting chamber may be taken out of service and the internal chamber containing the spent catalyst may be removed. The spare internal chamber containing a fresh load of catalyst can then immediately be placed into the external chamber. The reassembled reactor can be immediately pressure tested and the apparatus can be quickly placed back on stream. In this manner of operation, a shut-down to remove a plugged catalyst bed would take a matter of hours, as compared to a matter of days for a typical prior art shut-down wherein the prior art reactor containing a plurality of solid phosphoric acid catalyst beds must be completely shut-down and all catalyst must be removed. By utilizing a spare internal chamber for the inventive contacting apparatus, the spent catalyst in the removed chamber can be changed and reloaded with fresh catalyst at a more leisurely pace and at a more convenient time when maintenance manpower is free from other duties.

The typical reaction zone of a commercial aromatic alkylation or olefinic oligomerization plant comprises a plurality of separate super-imposed fixed beds of solid phosphoric acid catalyst in a single vertical reactor vessel. The inventive reaction chamber thus has one particular application as a guard reactor ahead of a typical prior art main reactor containing the major portion of catalyst in the plurality of separate beds. However, in utilizing the inventive chamber, it is preferred that the reactor section of a commercial unit comprise a plurality of individual catalyst beds contained in individual reactors of the type disclosed herein. The plurality of reactors may be operated in series or in parallel. Thus when any individual bed of solid phosphoric acid catalyst becomes plugged due to the deposition of catalyst fines or due to the deposition of carbonaceous materials, that individual reactor of the plurality can be taken off-stream while the remaining reactors of the plurality remain on-stream. The plugged reactor can then be quickly changed and reloaded with the fresh catalyst without requiring that the entire catalyst inventory of the commercial functioning unit be removed and changed. In addition, by using the inventive apparatus as a pluraliy of individual reactors, catalyst may be changed without requiring that the operating commercial plant be completely shut-down in order to change a single plugged catalyst bed.

Another advantage of the present invention is that the catalyst bed in the inventive reaction chamber is oriented in a horizontal position as compared with the prior art reactor vessels wherein the individual catalyst beds are oriented in a vertical position. Thus, in the present invention, feed fluid enters the top of a horizontal cylindrical catalyst bed and, therefore, the feed fluid passes through only a minor depth of catalyst. This may be compared to the prior art vertically cylindrical catalyst bed wherein the top of the catalyst bed is a circular configuration of lower cross-sectional area than that of the catalyst bed contained in the reactor of the present invention, and wherein the catalyst bed has a much greater depth. Thus by utilizing the reaction vessel of the present invention, at the start of operation a much lower pressure drop is experienced through the individual bed. In addition, since there is greater cross-sectional area of catalyst to be premeated by the flowing fluid, a greater duration of time will be experienced before a substantial pressure drop will be encountered across the bed due to plugging which requires the eventual shut-down of that reaction vessel.

A further advantage that is shown in the foregoing disclosure is that enhanced heat exchange between the feed fluid and the catalyst bed from the exothermic heat of reaction is afforded in utilizing the inventive apparatus. As seen from the disclosure hereinabove, feed fluid at a first temperature enters the reaction chamber by means of the fluid passageway 17 contained in the conduit means 5 centrally disposed within the catalyst bed. Since the catalytic reaction occurring in the catalyst bed is exothermic, heat is transferred from the catalyst bed 16 into the feed fluid in passageway 17. The heated feed fluid is discharged from the conduit means 5 into the end space 18 and thereafter into the annular space 20 at a second temperature. Additional heat input is then passed from the catalyst bed 16 to the feed fluid through the substantially cylindrical surface of the internal chamber. As the feed fluid passes upwardly in the annular space, it is given a final preheat before passing into the catalyst bed at a third temperature elevated substantially above the first temperature at which the feed fluid entered the reaction chamber.

These and other advantages of the inventive fluid-solids contacting apparatus and of the method of passing a feed fluid through a bed of particulated contact solids are readily ascertainable to those skilled in the art.

In addition, those skilled in the art will realize that the individual elements which comprise the embodiments disclosed hereinabove can be interchanged or modified in various ways without detracting from the broadness of the present invention. For example, external end member 4 is shown as a blind flange having fluid openings which provide for the inlet conduit 5 and the outlet port 8. However, the external end member 4 could be any type of an external head, such as a spherical head, or an elliptical head. So also, end member 15 could be other than a blind flange. In addition, the embodiment shown contains one conduit means 5, but those skilled in the art will realize that more than one conduit means could be located substantially axially within the catalyst beds. In addition, conduit means 5 could have a fin-tube configuration or it could comprise one or more helical coils sufficient to enhance heat exchange from the catalyst bed. However, it must be realized that conduit 5 should be positioned within the catalyst bed and have a configuration chosen to avoid the creation of physical obstructions within the bed which would interfere with the removal of spent catalyst or agglomerated catalyst particles.

As noted hereinabove, the preferred positioning of the inventive reaction chamber is in a horizontal orientation with perforate means 13 on the top of the internal chamber and fluid opening 19 located at the bottom. However, opening 19 could be positioned at the top of the internal chamber and perforate means 13 could be located on the bottom. Regardless of where located, however, opening 19 and perforate means 13 should be spacially oriented so that they are a maximum circumferential distance apart in order to obtain a maximum distance of fluid flow in annular space 20 and thereby enhance heat exchange between the flowing fluid and the catalyst bed.

Those skilled in the art will also recognize that the reactor need not be horizontally disposed but that it can be vertically disposed. In vertical position end member 4 could be at the bottom or at the top of the reactor. However, it is a preferred embodiment when the reactor vessel is vertically disposed, that the end member 4 be positioned at the top in order to more easily facilitate removal of the internal chamber when replacing the catalyst bed 16 contained therein. Those skilled in the art realize that when the chamber is used in a vertical orientation, the feed fluid will pass horizontally through the catalyst bed and transversely to the cylindrical axis.

While preferred application of the inventive apparatus and the fluid-solids contacting method is in aromatic alkylation and olefinic oligomerization reactions occurring in a bed of solid phosphoric acid catalyst, the utility of the inventive apparatus and contacting method is not so limited. The inventive apparatus and the method of contacting a fluid in the particulated solids contacting zone will have application in any type of service. Thus, the apparatus can be used where a fluid passes through a fixed bed of any type of catalyst or where the fluid passes through a fixed bed of an absorbent particulated contact solid. For example, the apparatus could be used for catalyst beds containing hydrocarbon conversion catalyst, such as hydrocracking or hydrotreating catalysts which also tend to plug with carbonaceous deposits. Similarly, the inventive apparatus may be used as a fluid-solids contacting chamber for absorption processes wherein a fixed bed of silica gel, molecular sieves or other absorbents may be contained within the internal chamber.

As noted hereinabove, the apparatus affords a means for preheating a feed while cooling the catalyst bed in an exothermic catalytic reaction zone. Such application of the apparatus, however, is not limited to exothermic catalytic reactions, and it is readily apparent to those skilled in the art that the apparatus can be applied to endothermic catalytic reactions. For example, a hot feed may enter the conduit means 5 and transfer heat into the catalyst bed 16. The cooled hot feed would then pass into the annular space 20 and further impart heat into the catalyst bed through the outer surface of the internal chamber. The feed fluid would then pass into the bed at a reduced temperature, but since the bed had been heated by the incoming hot feed fluid, a sufficient temperature would be maintained in the bed to conduct the endothermic reaction as required. Typical of endothermic reactions which may be undertaken within the inventive apparatus are catalytic hydroreforming reactions and catalytic dehydrogenation reactions of various types.

These and other embodiments of the inventive apparatus, and modifications of the method of contacting a feed fluid in a fluid-solids contacting zone, should in no way be construed to detract from the broadness of the present invention as disclosed herein. In addition, those skilled in the art will perceive other modifications and applications of the present invention which are obvious from the disclosure.

However, it may now be summarized that one particularly preferred embodiment of the present invention is a fluid-solids contacting chamber which comprises in combination a horizontally elongated external chamber having one closed end and open end; a substantially imperforate external end member containing a first fluid opening and a second fluid opening, attached to the open end of the external chamber in a manner sufficient to cover the open end and thereby confine the external chamber; a substantially imperforate horizontally elongated internal wall member having a perforated section, attached to the external end member, encompassing the first and second fluid openings, projecting into the external chamber in a manner sufficient to provide an annular space therein and terminating a finite distance from the closed end thereof; an internal end member containing a third fluid opening, attached to the internal wall member adjacent to the closed end of the external chamber whereby an internal chamber is confined within the internal wall member and the internal and external end members, and fitted against the external chamber in a manner sufficient to provide an end space adjacent to the closed end substantially isolated from the annular space and in fluid communication therewith by means of a fourth fluid opening adjacent to an imperforate section of the internal wall member; a fluid conduit means within the internal chamber passing from the first fluid opening to the third fluid opening; and, a perforated partitioning member dividing the internal chamber into a first zone communicating with the second fluid opening and partially encompassed by an imperforate section of the internal wall member, and into a second zone containing the fluid conduit means and at least partially encompassed by the perforated section of the internal wall member.

The invention claimed:

1. A fluid-solids contacting chamber which comprises in combination:
   (a) an elongated and horizontally disposed external chamber having one closed end and one open end;
   (b) a substantially imperforate external end member containing a first fluid opening and a second fluid opening, attached to the open end of said elongated external chamber in a manner sufficient to cover said open end and thereby confine said elongated external chamber;
   (c) a substantially imperforate elongated internal wall member having an upper perforated section, and a lower imperforate section attached to said external end member, encompassing said first and second fluid openings, projecting into said elongated external chamber in a manner sufficient to provide an annular space therein, and terminating a finite distance from the closed end thereof;
   (d) an internal end member containing a third fluid opening, attached to said internal wall member adjacent to the closed end of said elongated external chamber whereby an internal chamber is confined with said internal wall member and said internal and external end members, and fitted against said elongated external chamber in a manner sufficient to provide an end space adjacent to said closed end substantially isolated from said annular space and in fluid communication therewith by means of a fourth fluid opening adjacent to an imperforate section of said internal wall member, said internal wall member having a lower perforated section above said lower imperforate section, the space between said upper and lower perforated sections comprising a chamber adapted to receive fluid-solid contacting materials therein;
   (e) and a fluid conduit exit means from said chamber, whereby fluids entering said wall member and discharging into said end space spirally feed into said upper perforated section, through said contacting materials in said chamber, through said lower perforated section, and out of said exit means.

2. The contacting chamber of claim 1 wherein said internal chamber is divided by a perforated partitioning member into a first zone communicating with said second fluid opening and partially encompassed by an imperforate section of said internal wall member, and into a second zone containing said fluid conduit means and at least partially encompassed by said perforated section of said internal wall member.

3. The contacting chamber of claim 2 wherein said partitioning member extends from said external end member to said internal end member.

4. The contacting chamber of claim 2 wherein said perforated section of said internal wall member is located at a substantially maximum distance from said fourth fluid opening.

5. The contacting chamber of claim 4 wherein said perforated section of said internal wall member extends from a locus adjacent to said external end member to a locus adjacent to said internal end member.

6. The contacting chamber of claim 4 wherein said second fluid opening is located at a substantially maximum distance from said perforated section of said internal wall member.

7. The contacting chamber of claim 2 wherein said second zone contains a bed of particulated contact solids.

8. The contacting chamber of claim 7 wherein said first zone contains a filter medium.

9. The contacting chamber of claim 2 wherein said external end member is detachable from the open end of said elongated external chamber in a manner sufficient to provide for the removal of said internal chamber from said external chamber.

10. The contacting chamber of claim 9 wherein said internal end member is detachable from said internal wall member in a manner sufficient to provide for insertion of particulated contact solids into said second zone, and for removal of said solids from said zone.

11. The contacting chamber of claim 9 wherein at least a portion of said internal wall member is detachable from said external and internal end members in a manner sufficient to provide for insertion of particulated contact solids into said second zone, and for the removal of said solids from said zone.

12. Method for contacting a feed fluid in a fluid-solids contacting zone to produce an effluent fluid which comprises:
(a) passing said feed fluid into a conduit means disposed within a bed of particulated contact solids in a first direction of flow;
(b) passing said feed fluid from said conduit means into an annular fluid passageway encompassing said bed of particulated contact solids;
(c) passing said feed fluid within said annular passageway in a second direction of flow substantially circumferential and transverse to said first direction of flow and to the axis of said annular passageway;
(d) passing said feed fluid from said annular passageway into said bed of particulated contact solids in a third direction of flow substantially transverse to said first direction of flow and to the axis of said annular passageway, and substantially countercurrent to said second direction of flow; and,
(e) recovering effluent fluid from said bed of particulated contact solids.

13. Method of claim 12 wherein said feed fluid enters said conduit means at a first temperature, enters said annular passageway at a second temperature above said first temperature, and enters said bed of particulated contact solids at a third temperature above said second temperature.

14. Method of claim 12 wherein said feed fluid enters said conduit means at a first temperature, enters said annular passageway at a second temperature below said first temperature, and enters said bed of particulated contact solids at a third temperature below said second temperature.

15. Method of claim 12 wherein said bed of particulated contact solids comprises a fixed bed of a hydrocarbon conversion catalyst.

16. Method of claim 15 wherein said catalyst comprises a solid phosphoric acid catalyst.

17. Method of claim 12 wherein said first direction of flow is a substantially horizontal direction of flow, said second direction of flow is circumferential and substantially upward, and said third direction of flow is downward.

18. Method of claim 12 wherein said first direction of flow is a substantially horizontal direction of flow, said second direction of flow is circumferential and substantially downward, and said third direction of flow is upward.

19. Method of claim 12 wherein said first direction of flow is a substantially vertical direction of flow, said second direction of flow is circumferential and substantially horizontal, and said third direction of flow is substantially horizontal and countercurrent to said second direction of flow.

20. A fluid-solids contacting chamber which comprises in combination:
(a) an elongated substantially confined external chamber;
(b) an elongated substantially confined internal chamber disposed within said external chamber in a manner sufficient to confine an annular space between said chambers;
(c) a first fluid inlet means in said external chamber having fluid communication with said annular space at a first locus;
(d) a second fluid inlet means in said internal chamber having fluid communication with said annular space at a second locus removed from said first locus, and contained in a section of said internal chamber confining said annular space whereby said internal chamber and said annular space are in direct fluid communication; and,
(e) means for passing fluid out of said internal and external chambers in fluid isolation from said annular space.

21. The contacting chamber of claim 20 wherein said first fluid inlet means comprises a conduit means passing through said internal chamber in fluid isolation therefrom.

22. The contacting chamber of claim 20 wherein said internal chamber contains a bed of particulated contact solids.

References Cited

UNITED STATES PATENTS

| 2,974,020 | 3/1961 | Kassell | 23—288 |
| 2,997,374 | 8/1961 | Lavender et al. | 23—288 |
| 3,249,405 | 5/1966 | Waddill | 23—288 |
| 3,475,508 | 10/1969 | King | 23—288 |
| 3,477,833 | 11/1969 | McMullin et al. | 23—288 |

CURTIS R. DAVIS, Primary Examiner

U.S. Cl. X.R.

23—288 R, 288 M; 260—624, 683.15